US000001052H

United States Statutory Invention Registration [19]

[11] Reg. Number: H1052

Peebles, Jr. et al.

[43] Published: May 5, 1992

[54] METHOD FOR STABILIZATION OF PAN-BASED CARBON FIBERS

[76] Inventors: Leighton H. Peebles, Jr., 8204 Mockingbird Dr., Annandale, Va. 22003; A. S. Abhiraman; Gajanan S. Bhat, both of 1233 Teakwood Trail, Stone Mountain, Ga. 30083

[21] Appl. No.: 373,980

[22] Filed: Jun. 30, 1989

[51] Int. Cl.[5] ..... D01F 9/12

[52] U.S. Cl. ..... 423/447.7; 423/447.1; 423/447.2; 423/447.4

[58] Field of Search ..... 423/447.1, 447.2, 447.4, 423/447.6, 447.7; 264/29.2, 29.6

[56] References Cited

U.S. PATENT DOCUMENTS

| | | | |
|---|---|---|---|
| 3,661,503 | 5/1972 | Didchenko et al. | 423/447.7 |
| 3,661,616 | 5/1972 | Miyamichi | 423/447.4 |
| 3,718,574 | 2/1973 | Araki et al. | 423/447.7 |
| 4,100,004 | 7/1978 | Moss et al. | 423/447.2 |
| 4,285,831 | 8/1981 | Yoshida et al. | 423/447.2 |
| 4,378,343 | 3/1983 | Sugiura et al. | 423/447.1 |
| 4,534,920 | 8/1985 | Yoshinaga et al. | 264/29.6 |
| 4,609,540 | 9/1986 | Izumi et al. | 423/447.2 |
| 4,671,950 | 6/1987 | Ogawa et al. | 423/447.1 |
| 4,762,652 | 8/1988 | Miyamori et al. | 423/447.7 |

FOREIGN PATENT DOCUMENTS

| | | | |
|---|---|---|---|
| 47-24184 | 7/1972 | Japan | 423/447.7 |
| 47-40093 | 10/1972 | Japan | 423/447.7 |
| 50-5697 | 1/1975 | Japan | 423/447.2 |

*Primary Examiner*—Richard D. Lovering
*Assistant Examiner*—Joseph D. Anthony

[57] ABSTRACT

Polyacrylonitrile (PAN) based fibers are stabilized by heating them in an atmosphere containing oxygen and ammonia from room temperature to 150°–350° C., prior to carbonization and high-temperature treatment or graphitization to form carbon fibers. PAN fibers stabilized in presence of oxygen and ammonia have a higher density, and the time required for stabilization is shortened compared to being stabilized with air in the absence of ammonia, stabilization in absence of oxygen and ammonia, and stabilization in pure ammonia.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR STABILIZATION OF PAN-BASED CARBON FIBERS

BACKGROUND OF THE INVENTION

1. Field of the Invention

This invention relates to carbon fibers, and more particularly, to an improved process for stabilizing polyacrylonitrile (PAN) based fibers prior to carbonization and high-temperature heat treatment.

2. Description of the Prior Art

There has been an increasing demand for construction materials of high strength-to-weight ratio and high Young's modulus for use in civilian and military applications, particularly for materials that have good thermal stability. Accordingly, there has been a demand for improved reinforcing fibers to be embodied in structural composites which are exposed to conditions of high temperature and high mechanical stress.

Carbon fibers are produced in five manufacturing steps: polymerization of monomers, such as acrylonitrile; orientation of the linear polymer molecules by spinning them into fibers; stabilization by heating the fibers to 150°-350° C.; carbonization at 1000°-1500° C.; and high-temperature heat treatment above 2000° C. to produce high-modules carbon fibers.

During the stabilization process, PAN filaments are heated to 150°-350° C. in air for several hours under tension. Volatile components, including ammonia, HCN, carbon monoxide, carbon dioxide and light hydrocarbons are evolved, and oxygen from the air reacts with the polymer. The linear polyacrylonitrile polymer molecules cross-link, forming stable filaments. During the subsequent carbonization step, hydrogen, oxygen, and nitrogen-containing compounds are progressively pyrolized, leaving eventually fibers of essentially pure carbon. The microstructure of the stabilized fiber precursor has bearing on the structure and mechanical properties of the final carbon fiber product.

Numerous methods of conducting the stabilization of polymer fibers aimed at improving the properties of the resulting carbon fiber are known in the prior art. Turner (U.S. Pat. No. 3,862,334) conducts the stabilization between 200° and 300° C. in an inert atmosphere and then continues in an oxygen-containing atmosphere between 150° and 250° C. Shindo (U.S. Pat. No. 3,529,034) stabilizes cellulosic, polyvinyl alcohol, or acrylic fibers at elevated temperatures in presence of hydrogen chloride vapor. Riggs (U.S. Pat. No. 3,961,888) stabilizes polyacrylonitrile fibers first in an inert atmosphere and later in an oxygen-containing atmosphere. Yoshida et al. (U.S. Pat. No. 4,256,607) produces activated carbon fibers with properties similar to activated carbon black by first stabilizing acrylic fibers in air at 200°-300° C. and then activating the fibers at 700°-1000° C. in presence of ammonia, carbon dioxide or water vapor. Warner (U.S. Pat. No. 4,295,844) stabilizes acrylic fibers in air at 200°-360° C. after contacting them with aniline. Cagliostro (U.S. Pat. No. 4,385,043) stabilizes polyacrylonitrile fibers at elevated temperature in an oxidizing atmosphere and then in an inert atmosphere into which acetylene is added.

SUMMARY OF THE INVENTION

The present invention relates to an improved process of stabilization of PAN-based fibers prior to carbonization and high-temperature heat treatment or graphitization.

During the stabilization of PAN-based fibers in the 200°-375° C. temperature range, an exothermic heat of reaction is evolved as the polyacrylonitrile molecules cross-link. If this reaction is allowed to take place too rapidly and the exothermic heat is evolved too quickly, overheating of the fibers and structural damage will occur. The result, upon carbonization and graphitization, will be an inferior carbon fiber product.

It is an object of this invention to provide an improved process for stabilization of PAN fibers prior to carbonization and high-temperature treatment or graphitization. It is a further object to stabilize such fibers in a manner such that, upon subsequent carbonization and graphitization, fibers of improved mechanical properties will be produced. It is yet another object of this invention to provide an improved method for controlling the polymeric microstructure which evolves during the cross-linking of PAN in such manner as to produce a stabilized fiber precursor which, upon carbonization and high-temperature treatment or graphitization, produces carbon fibers of improved quality.

These and other objects are achieved by heating PAN-based fibers at a temperature from about 150° to about 350° C. in an oxidizer-ammonia atmosphere.

DETAILED DESCRIPTION OF THE INVENTION

PAN-based fibers are heated in a furnace at a temperature from about 150° to about 350° C., in which the fiber stabilization process takes place. Preferably, the fibers are heated to 225°-300° C. The furnace atmosphere during this heating step comprises an oxidizer and ammonia. The preferred oxidizer in oxygen. The oxidizer-ammonia atmosphere can contain other gases, for example, nitrogen or argon. These additional gases are inert and function as diluent or carrier gases. The preferred atmosphere is air and ammonia. The amount of oxygen in the atmosphere is from about 5 to 30 volume percent, the amount of ammonia is from about 2 to about 95 volume percent, and the amount of diluent or carrier gases is from about 5 to 77 volume percent. The preferred amount of ammonia in the preferred atmosphere is from 20 to 50 volume percent. The most preferred atmosphere comprises 15 to 40 volume percent of ammonia and 60 to 85 volume percent of air.

Heating is continued until the fiber has been stabilized Stabilization is determined imperically in several ways, for example, color change, change in weight, and the burning test. Additional details of these tests are given in the examples. Some stabilization can be obtained with a heating time as low as about one half of an hour with some fibers. Generally, adequate stabilizations are obtained in one to two hours. It is preferred that the fibers are kept under moderate tension to maintain the orientation of the polymer molecules along the axis of the fiber. Maintaining the molecular orientation in the fiber enhances fiber strength.

The stabilization method of this invention can have several heating stages. For example, the fiber are preheated to a temperature from about 100° to 200° C. The temperature is raised in one or more stages to the final temperature. The atmosphere surrounding the fibers can be changed at each stage. The atmosphere during the preheat stage can be air. Multistage heating can be obtained with a multizone furnace.

The air-ammonia mixture being passed through the furnace during the fiber stabilization process may be generated by bubbling air through a concentrated aqueous solution of ammonia at room temperature. The solution contains 15–30 mol percent (14.25–28.81 weight percent) of ammonia. The air, being bubbled through the concentrated ammonia solution, contains 10–70 mol percent of ammonia and the oxygen concentration is correspondingly lowered by dilution from its value in pure air, 21 percent, to 6–19 mol percent.

Alternatively, an alkaline solution of an ammonium salt having an appreciable vapor pressure vapor pressure of ammonia may be used to generate an air-ammonia mixture. As a further alternative, anhydrous ammonia gas as dispensed from a pressurized cylinder via a pressure reducer and flow control valve may be mixed with air and introduced into the furnace. Any ratio of ammonia to air may be realized by these methods.

EXAMPLES

The effect of the presence of ammonia and oxygen in the furnace atmosphere during stabilization of PAN-based fibers at 260° C. upon certain properties of the fibers is illustrated by the following tables.

TABLE 1

Comparison of Air and Air-Plus-Ammonia Stabilized Acrylic Fibers at 260° C.

| Time of Stabilization, minutes | Density, gms/cc | | | Color Change | | |
|---|---|---|---|---|---|---|
| | (1) | (2) | (3) | (1) | (2) | (3) |
| 0 | 1.175 | 1.175 | 1.175 | white | white | white |
| 4 | 1.18 | 1.21 | 1.18 | yellow | dk. br. | lt. yellow |
| 8 | 1.19 | 1.27 | 1.19 | brown | black | yellow |
| 16 | 1.21 | 1.29 | 1.21 | dk. br | black | dk. yellow |
| 32 | 1.28 | 1.38 | 1.30 | black | black | lt. brown |
| 64 | 1.37 | 1.41 | 1.33 | black | black | brown |
| 128 | 1.47 | 1.44 | 1.34 | black | black | dk. brown |

Notes: (a) air only; (2) air/ammonia; (3) nitrogen only;

TABLE 2

Comparison of Air and Air-Plus-Ammonia Stabilized Acrylic Fibers at 250° C.

| Time of stabilization, minutes | Burning test | | | Exotherm cal/gm | | |
|---|---|---|---|---|---|---|
| | (1) | (2) | (3) | (1) | (2) | (3) |
| 0 | F | F | F | 111 | 111 | 111 |
| 4 | F | F | F | 106 | 100 | 111 |
| 8 | F | F | F | 106 | 61 | 101 |
| 16 | F | F | F | 102 | n.d. | 79 |
| 32 | F | P | F | 39 | n.d. | n.d. |
| 64 | P | P | F | n.d. | n.d. | n.d. |

Notes: (1) air only; (2) air/ammonia; (3) nitrogen only; n.d. = not detected.

TABLE 3

| Stabilization time, minutes | Color Change Ammonia concentration, vol. % in air | | | |
|---|---|---|---|---|
| | 2 | 5 | 10 | 100 |
| 4 | dk. yellow | dk. yellow | lt. brown | yellow |
| 8 | dk. brown | black | black | dk.yellow |
| 16 | black | black | black | brown |
| 32 | black | black | black | brown |
| 64 | black | black | black | brown |
| 128 | black | black | black | dk. brown |

The stabilization of the fibers shown in Table 1 was found to have occurred at about 1.37 gms/cc. The density of the fibers during stabilization is seen to grow more rapidly in presence of ammonia. In the absence of oxygen and ammonia, the growth in fiber density is seen to be slower.

The color change from white to black indicates progressing stabilization. In presence of ammonia, the color change to dark brown and black is seen to occur sooner than with air alone, indicating that ammonia accelerates the stabilization process. In the absence of oxygen and ammonia the color change occurs later, indicating slower stabilization.

The burning test is another indication of the degree of stabilization. Fully stabilized fiber will not burn, whereas incompletely stabilized fibers burn and disintegrate when subjected to the flame of a match. It is seen that the fibers pass the burning test after 32 minutes of stabilization in presence of ammonia. Sixty-four minutes of stabilization are needed in air in the absence of ammonia for the fibers to pass the burning test. In absence of oxygen and ammonia, after 64 minutes, the fibers still do not pass the burning test.

The exotherms measured by differential scanning colorimetry (DSC) analysis indicate that in presence of ammonia, the exotherms are consistently lower than in the absence of ammonia. Other evidence indicates that the exothermic heat evolved during polymerization may cause overheating and disintegration of the fibers. The presence of ammonia, by lowering the exothermic heat of reaction, thus prevents overheating and fiber disintegration. In the absence of oxygen and ammonia, the exotherm decreases more slowly for the first eight minutes of stabilization and then decreases rapidly.

It is thus apparent that the addition of ammonia to the air in the stabilizing furnace accelerates the process of stabilization of the PAN fibers. The results in Table 3, however, indicate that in a 100% ammonia atmosphere, the stabilization is slow. Both oxygen and ammonia are thus required for rapid stabilization of the PAN fibers.

The data in Table 3 indicate an accelerating effect over the range of 2–10 volume percent of ammonia. Other experiments indicate that the accelerating effect is present at much higher concentrations of ammonia in the furnace atmosphere such as are generated by bubbling air through concentrated ammonium hydroxide, which may be as high as 70 volume percent. It is thus apparent that accelerated fiber stabilization is observed at least from 2 to 70 volume percent of ammonia in the atmosphere, which corresponds to an oxygen concentration range from 6 to 20.6 volume percent.

While this invention has been described in detail with reference to a specific embodiment thereof, it will be apparent to one skilled in the art that various changes and modifications can be made therein without departing from the spirit and scope thereof.

What is claimed is:

1. A process for the stabilization of polyacrylonitrile-based fibers comprising heating said fibers in a furnace to a temperature ranging from about 150° to about 350° C. in an atmosphere comprising from about 5 to 30 volume percent of oxygen, from about 2 to about 95 percent of ammonia, and from about 5 to about 77 volume percent of a diluent gas.

2. The process according to claim 1 wherein said temperature is from 225° to 300° C.

3. The process according to claim 1 in which the atmosphere contains 2 to 70 volume percent of ammonia and 6 to 20.6 volume percent of oxygen, the remainder being nitrogen.

4. The process of claim 3 wherein the fibers are maintained under tension during heating, thereby strengthening the fibers.

5. The process of claim 4 wherein said atmosphere comprises air and ammonia.

6. The process of claim 5 wherein said atmosphere comprises 15 to 40 volume percent of ammonia and 60 to 85 volume percent of air.

* * * * *